United States Patent [19]
Ruthrof

[11] 3,807,568
[45] Apr. 30, 1974

[54] DEVICE FOR SEPARATING SOLIDS AND OTHER FOREIGN BODIES FROM LIQUIDS

[75] Inventor: Klaus Ruthrof, Erlangen, Germany
[73] Assignee: Siemens Aktiengesellschaft, Berlin, Germany
[22] Filed: Dec. 20, 1971
[21] Appl. No.: 209,734

[30] Foreign Application Priority Data
Dec. 24, 1970 Germany............................ 2063892

[52] U.S. Cl.................. 210/304, 210/312, 210/512, 210/433
[51] Int. Cl............................................. B01d 21/26
[58] Field of Search ........... 210/304, 391, 409, 418, 210/435, 441, 452, 497, 512, 302, 312, 433

[56] References Cited
UNITED STATES PATENTS
3,481,474 12/1969 Paulson.............................. 210/304
502,583 8/1893 Rankine.............................. 210/418

Primary Examiner—John Adee
Assistant Examiner—Ivars Cintins
Attorney, Agent, or Firm—Herbert L. Lerner

[57] ABSTRACT

A device for separating solids and other foreign bodies from a liquid in a pipe conduit having a longitudinal axis has a cylindrical screen receivable in the pipe conduit coaxially to the longitudinal axis thereof. The cylindrical screen is closed at one of its ends and defines with the pipe conduit an annular space closed at the ends thereof. An inlet is disposed tangentially to the conduit for admitting liquid containing foreign bodies into the conduit. The inlet communicates with the annular space for supplying the liquid containing foreign bodies thereto, so that at least a portion of the liquid passes through the screen leaving foreign bodies deposited on the screen. A discharge arrangement for discharging from the annular space the foreign bodies separated from the liquid is also provided.

12 Claims, 4 Drawing Figures

DEVICE FOR SEPARATING SOLIDS AND OTHER FOREIGN BODIES FROM LIQUIDS

The invention relates to a device for separating solids and other foreign bodies from liquids in a pipe line or pipe conduit. The device of the invention includes a screen disposed coaxially in the pipe conduit.

For separating solids and other foreign bodies from liquids in a pipe line or pipe conduit, it is known to install screens in the pipe line which intercept the bodies. These bodies can then be discharged continuously or intermittently through an outlet in the pipe line.

Such screens operate without difficulty for separating granular solids. If, however, the liquid also contains fibers or flat substances, they are also held back by the screen, but the cleaning of the screen is accompanied by great difficulty and is hardly possible without access from the outside.

It is therefore an object of the invention to provide a device for the separation of solids which includes a screen having a surface which can be readily cleaned, the screen being installed in the pipe line.

More specifically, it is an object of the invention to provide a device for separating solids and other foreign bodies of a liquid which includes a screen mounted in the conduit for which physical access to the screen for cleaning the latter is unnecessary.

According to a feature of the invention, a screen configured as a cylinder and closed off at one end face is mounted in the pipe line coaxially with the axis of the pipe line. The flow moves from the outside of the screen to the inside thereof. In the region of the screen, the pipe line has a tangential inlet for the liquid to be purified opening into an annular or ring space between the screen and the pipe line, the ring space being for the liquid to be purified. Discharge means for discharging the bodies deposited on the surface of the screen is also provided in the region of the screen. The discharge means can comprise an outlet disposed tangentially to the conduit and communicating with the annular space. The foreign bodies deposited on the screen pass from the annular space through the outlet.

With the tangential inlet, the liquid to be purified is directed along a helical path; this achieves the condition that only small amounts of the bodies settle on the surface of the screen through which the flow proceeds from the outside to the inside. Instead, the bodies are carried directly to the inner wall of the pipe and are discharged from there reliably by the flow.

In order to facilitate the cleaning of the screen also if fibrous materials are deposited, the screen is provided on the inside with a barrier extending in the shape of a helix between the individual rows of holes of the screen. This barrier prevents fibrous materials which have settled in the holes of the screen and partially hang inwardly through the screen from becoming entangled between two adjacent hole rows of the screen. Such entanglement would make it difficult to pull the fibrous materials back to the outside and carry them away from the surface of the screen.

For cleaning the screen intermittently, it is preferable if the discharge means comprises an adjustable throttle valve or flap valve built into the pipe line on the discharge side or entrance side of the screen. With the flap valve, the main flow can be partially interrupted so that the entering liquid with the impurities floated away from the surface of the screen can be carried away through the discharge line.

The tangential inlet for the liquid is advantageously arranged in the region of the end face of the screen which is closed off, while the tangential discharge for the bodies is situated in the region of the open discharge end of the screen. For obtaining a better direction of the flow and cleaning of the screen, the cylindrical part of the screen can be configured in the region of the tangential liquid inlet as a closed cylindrical section of pipe or, according to another embodiment, the end section of the screen can have a closed conical form.

For an upright arrangement of the screen, it is advisable that the tangential discharge be configured as a longitudinal slot in the pipe line extending approximately over the entire length of the screen.

Although the invention is illustrated and described herein as a device for separating solids and other foreign bodies from liquids, it is nevertheless not intended to be limited to the details shown, since various modifications may be made therein within the scope and the range of the claims. The invention, however, together with additional objects and advantages will be best understood from the following description and in connection with the accompanying drawings in which:

Figure 1:
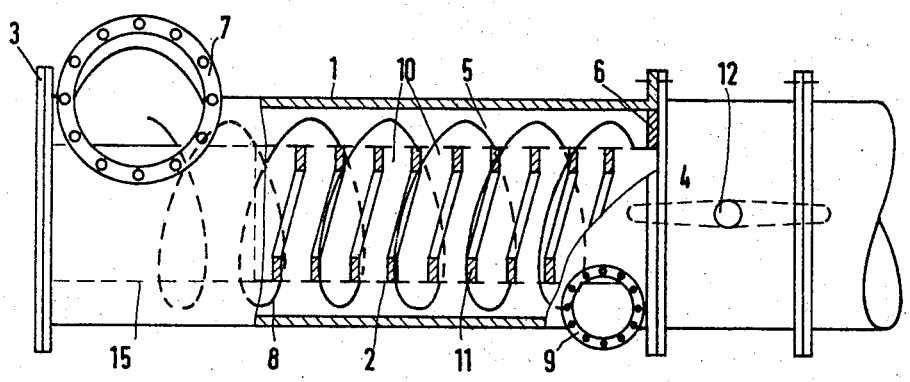
FIG. 1 illustrates in longitudinal cross-section, a horizontally extending pipe line equipped with built-in cylindrical screen as required by the invention.

Referring to FIG. 1, a cylindrical screen 2 is installed in the pipeline 1 through which the liquid to be purified flows. The screen 2 is closed off on one of its end faces, together with the pipe line by the plate 3. On the discharge side 4 of the screen 2, the annular or ring space 5 between the screen 2 and the pipe line 1 is likewise closed off by a ring diaphragm 6, so that the ring space 5 is bounded on both sides.

In the vicinity of the closed off end face 3 of the screen 2 and the pipe line 1, the pipe line has a tangential inlet stub 7 through which the liquid to be purified is directed to the screen 2. Because of this tangential feed 7, a helical course is imparted to the flow corresponding to the flow line 8 which runs concentrically with the surface of the screen 2. The liquid to be purified flows from the outside to the inside through the screen and, through the opening 4, into the following main pipe line. The impurities carried along with the liquid are deposited on the surface of the screen 2 and can be discharged from the ring space 5 to the outside via a further tangential stub 9 located in the vicinity of the ring diaphragm 6. Because of the helical path of the flow in the region of the screen, impurities deposited on the surface of the screen 2 are carried along for the most part toward the open end 4 of the screen and can therefore be carried away continuously via the outlet stub 9.

Figure 2:
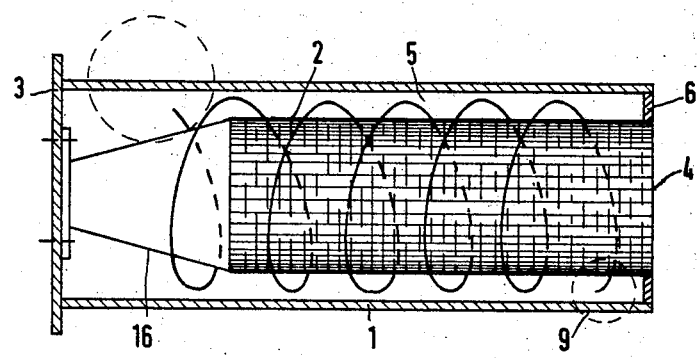
FIG. 2 illustrates in longitudinal cross-section, a separating device equipped with a conical, closed screen tip.

In this connection, it is preferable that the screen 2 be configured as a closed pipe section 15 without screen holes in the region of the tangential liquid inlet 7. As may be seen particularly from FIG. 2, the pipe section 16 can be here also of conical shape, whereby the helically flowing threads are pulled outwardly in the region of the ring space 5. In order to enable the screen, however, to handle also the separation of fibrous substances, there are arranged on the inside of the screen 2, that is on the discharge side, flange-like members 11 extending between the individual rows of holes 10, perpendicularly to the surface of the screen and transversely to the direction of the flow. These flange-like members 11 prevent fibrous material which were stuck in the holes 10 of the screen 2 from becoming entangled with each other on the inside of the screen and therefore can no longer be pulled to the outside.

A particularly effective cleaning of the screen 2 is made possible by providing a flap 12 behind the discharge side of the screen 4 which is closed, so that the pressure difference between the outside and the inside of the screen is reduced to a large extent; this pressure difference is essentially responsible for holding the flat and fibrous impurities. Due to the helical path of the flushing liquid, the solids adhering to the surfaces of the screen can thereby be floated away more easily and discharged reliably via the outlet 9. With such a mode of flushing, fibrous materials will also be pulled back outwardly from the holes 10 of the screen 2 into the annular space 5, so that the screen is thereby completely cleaned.

Figure 3:
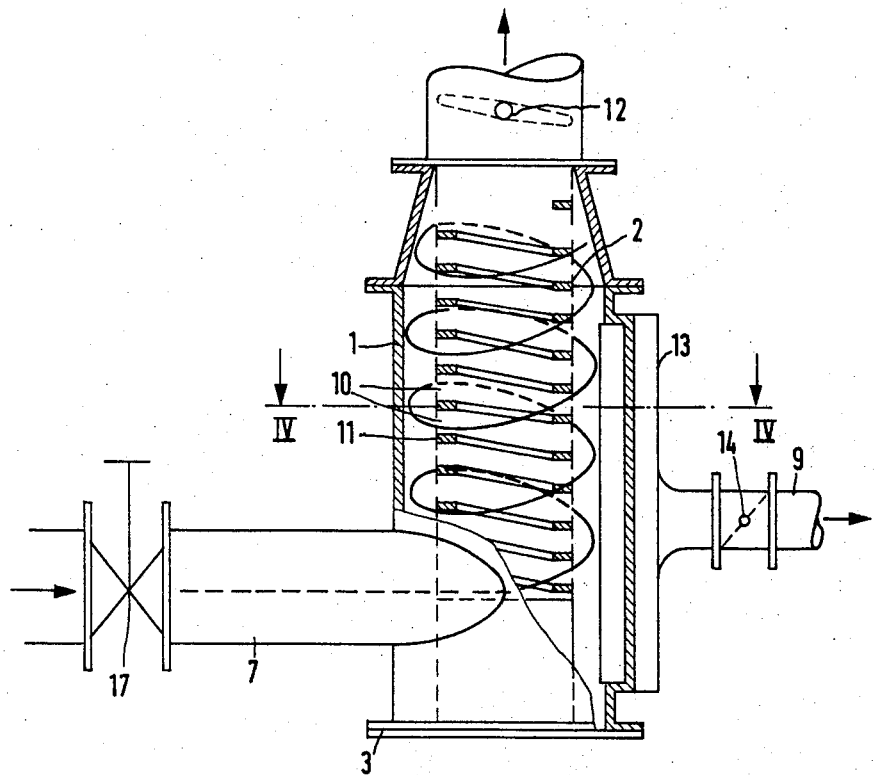
FIG. 3 illustrates in longitudinal cross-section, an upright configuration of a separating device according to the invention; and, FIG. 4 illustrates a section view taken along ling IV-IV of the separating device according to FIG. 3.
Figure 4:
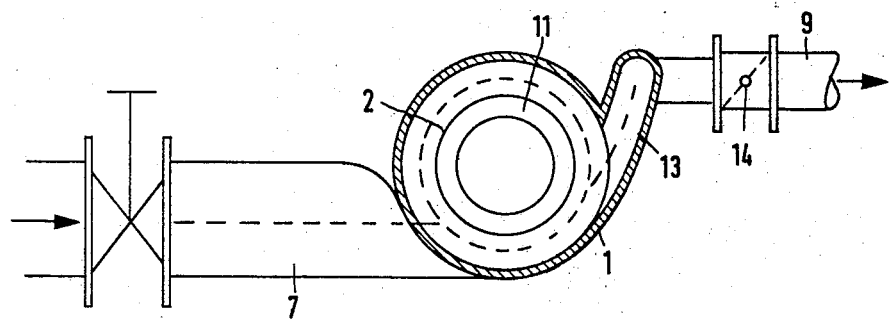

In FIGS. 3 and 4, a similar device is shown in a vertical arrangement. Here, too, a cylindrical screen 2 is coaxially mounted in the pipe line 1 and is closed off at its lower end face by means of a plate 3. The liquid to be purified is fed in via a tangential inlet stub 7, in which a flap valve 17 can be installed. Because a discharge of the separated solids by the action of gravity only at the discharge end of the screen would not be sufficient, the wall of the pipe is provided, according to this embodiment, with a tangential outlet 13 extending practically over the entire length of the screen, from which the discharge line 9 for the impurities then starts. The helical path of the liquid flow causes solids carried along by the liquid to be directed for the most part to the inner wall of the pipe. Consequently, these solids are reliablly intercepted by the tangential outlet 13 and can be directed away from this location. Also in this embodiment, it is possible to arrange a flap valve behind the screen in order to produce an amplified circulating flow for cleaning the surface of the screen.

Furthermore, flange-like members 11 are also arranged here on the inside of the screen between the individual rows of holes 10; these members 11 prevent fibrous impurities from becoming lodged.

The separator devices described are of particular significance for the purification of cooling water in steam generating plants. Because the screens of the invention are configured so as to be suitable for separating flat or fibrous solids and because these screens need practically no maintenance, it is possible to dispense with the expensive traveling screen filters used at the entrance in similar cooling circuits and the cylindrical screens alone can take over the cleaning of the cooling water.

I claim:

1. Device for separating solids and other foreign bodies from a liquid in a pipe conduit having a longitudinal axis, comprising a cylindrical screen receivable in a pipe conduit coaxially to the longitudinal axis of the pipe conduit, said cylindrical screen having a plurality of row of holes, being closed at one of its ends and defining with the pipe conduit an annular space closed at the ends thereof, a flange-like member extending helically on the inner side of the screen between said row of holes, inlet means disposed tangentially to the conduit for admitting liquid containing foreign bodies into the conduit, said inlet means communicating with said annular space for supplying the liquid containing foreign bodies thereto, so that at least a portion of the liquid passes through said screen leaving foreign bodies deposited on said screen, and outlet means for discharging from the annular space the foreign bodies separated from the liquid.

2. Device of claim 1 wherein said screen has an open end communicating with the pipe conduit, and wherein said discharge means comprises an adjustable throttle valve receivable in the pipe conduit at said outlet end, and outlet means disposed tangentially to the conduit communicating with said annular space for passing the foreign bodies from said annular space when said valve is adjusted to throttle the liquid flowing through the pipe conduit.

3. Device of claim 1 wherein said inlet means is located in the region of the closed end of said cylindrical screen.

4. Device of claim 2 wherein said outlet means is located in the region of said open end of said cylindrical screen.

5. Device of claim 1, said cylindrical screen being a closed tubular member in the region of said inlet means.

6. Device of claim 1, said cylindrical screen being a closed conical member in the region of said inlet means.

7. Device of claim 1 wherein said screen and at least the portion of the pipe conduit wherein said screen is disposed are arranged so as to extend longitudinally in an upward direction, and wherein said discharge means comprises a longitudinal slitlike opening in the pipe conduit extending approximately the entire length of the screen.

8. Device of claim 7 wherein a discharge conduit communicates with said slit-like opening, and wherein said discharge means comprises a throttle valve disposed in the discharge conduit.

9. Device of claim 1, said inlet means comprising an adjustable throttle valve for throttling the flow of liquid containing foreign bodies to said annular space.

10. Device of claim 1 wherein the outlet means is disposed tangentially to the conduit.

11. Device of claim 1 wherein the screen is free of holes adjacent the area of communication of the inlet means with said annular space.

12. Device of claim 11 wherein the outlet means is disposed tangentially to the conduit.

* * * * *